United States Patent [19]

Ullmann

[11] 4,426,908
[45] Jan. 24, 1984

[54] ELASTIC TENSION MEMBER

[76] Inventor: Martin Ullmann, Reichgasse 59, CH-9030 Abtwil, Switzerland

[21] Appl. No.: 356,887

[22] Filed: Mar. 10, 1982

[30] Foreign Application Priority Data

Mar. 11, 1981 [CH] Switzerland ............... 1637/81

[51] Int. Cl.³ .............................................. D04C 1/12
[52] U.S. Cl. .................................................. 87/6; 87/2;
87/7; 87/11; 114/253; 280/480; 440/34
[58] Field of Search .................................. 87/2, 6–9,
87/11; 280/480; 114/242–253; 440/33, 34

[56] References Cited

U.S. PATENT DOCUMENTS

| 1,498,701 | 6/1924 | Taylor et al. | 87/6 |
| 2,051,316 | 8/1936 | Shaw | 87/2 X |
| 2,452,228 | 10/1948 | Dawes et al. | 87/2 |

*Primary Examiner*—John Petrakes
*Attorney, Agent, or Firm*—Pollock, Vande Sande & Priddy

[57] ABSTRACT

An elastic tension member comprises a jacket surrounding a core, the latter comprising a non-stretchable line in working relation with at least one elastic member. The line may comprise a cord, the terminal portions of the elastic member being fastened to the cord at spaced mounting joints. Tension forces applied to the elastic member are transferred to the non-stretchable line as soon as a predetermined maximum tension load value has been reached. This characteristic contributes to rendering the elastic tension member suited for towing purposes, or as a start-cord for surf boards, or as a tieing device for tieing up goods.

7 Claims, 6 Drawing Figures

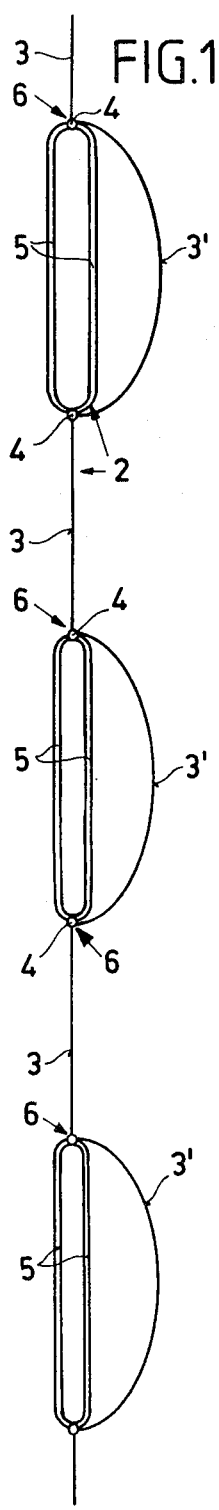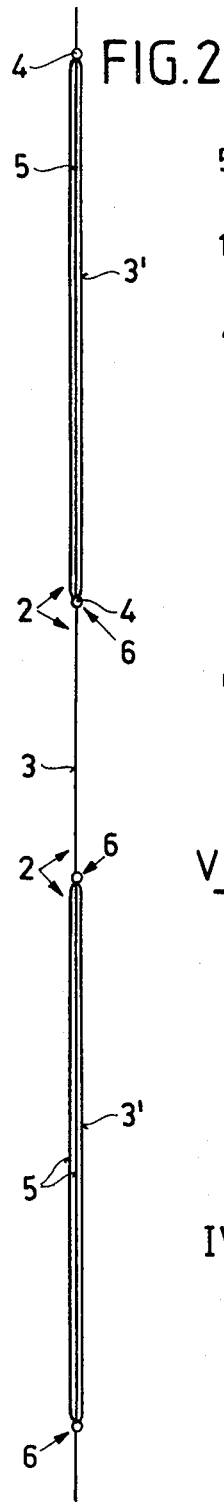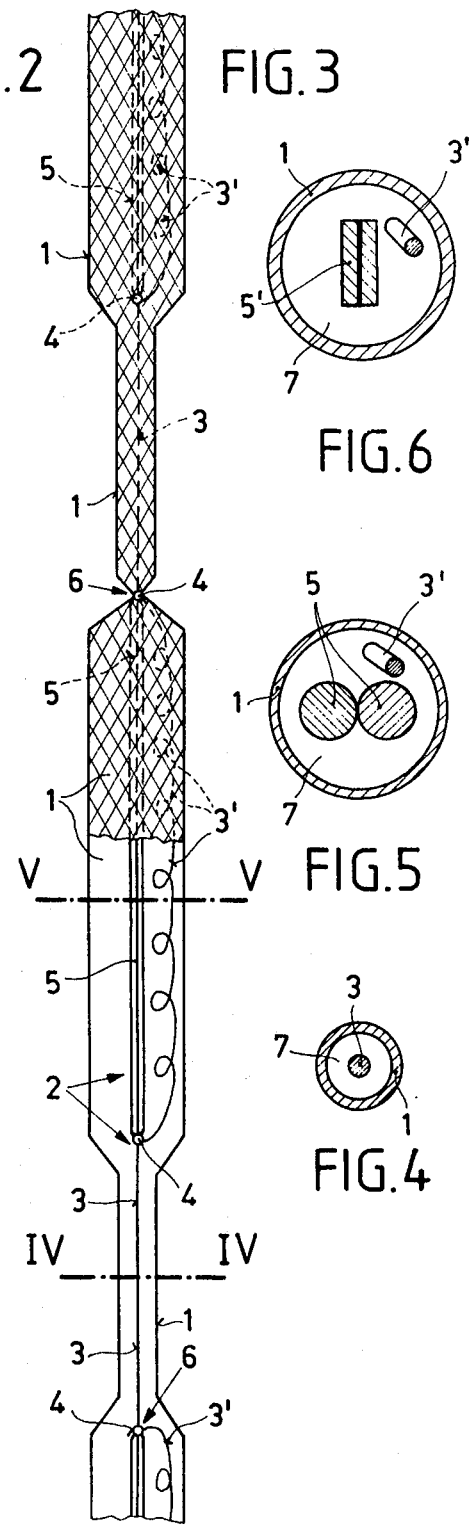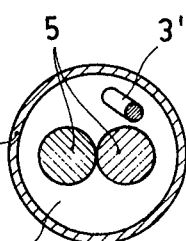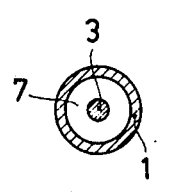

ELASTIC TENSION MEMBER

BACKGROUND OF THE INVENTION

1. Field of the Invention

The present invention relates to a new and improved design of an elastic tension member. The invention relates in particular to tension members used for towing purposes or as start-cords used in connection with surf boards, or as tieing devices for goods. The invention also relates to a method for producing the aforementioned elastic tension member.

2. Description of the Prior Art

Elastic tension ropes and straps have long been known in the art and have often been used in connection with V-belt drives. They are not suited for towing vehicles. This also holds true for start-cords used in connection with surf boards for raising the sails from the water, or for ropes used for securing goods, such as crates, onto vehicles. No load limits are usually set for such elastic tension members; this may easily result in the distortion or tear of such members. These conventional elastic tension members cannot be properly used for towing vehicles either, because in such cases the tension members may become overstretched and the restoring force too vigorous, so as to cause jerky movements and impact forces. A sail may be raised from the water properly and with ease only if the start-cord used therefor is elastic at the beginning of the raising operation and becomes stretched thereafter. Similarly, when transporting heavy goods, such as crates, on vehicles, the safety achieved is better if the tension member remains elastic only within predetermined limits of the load.

SUMMARY OF THE INVENTION

It is an object of the invention, to set a limit to the load value applied to an elastic tension member, such as a tow rope, a start cord used with surf boards or a tie rope for transported goods, and thereby to cause the elastic behaviour of the elastic member to cease as soon as said load limit is surpassed.

The foregoing and other objects are attained in accordance with one aspect of the present invention through providing within a hoselike jacket a core comprising a line non-stretchable throughout it length, as well as at least one elastic member connected to the line at two spaced mounting joints, the segment of the line located between the joints being curly and longer than the elastic member, so that any acting tension forces are transferred to the non-stretchable line, as soon as a specific maximum load of the elastic member has been reached.

The terminal portions of the elastic member may be fastened to the non-stretchable line, which consists, by preference, of a cord. The fastening may be done by means of clamps or buttons constituting the mounting joints.

The core is preferably disposed within the jacket with play, an inner space being thus provided for receiving the curly segment of the non-stretchable line. The jacket, which consists, by preference, of a plait, may be produced by braiding strands, while at the same time the elastic member and the line are held stretched.

BRIEF DESCRIPTION OF THE DRAWINGS

Various objects, features and attendant advantages of the present invention will be more fully appreciated as the same becomes better understood from the following detailed description of the present invention when considered in connection with the accompanying drawing, in which:

FIG. 1 shows the core of the tension member in its normal non-tensioned state, in schematic form;

FIG. 2 shows a portion of said core in its extended state;

FIG. 3 shows the tension member partially in longitudinal section;

FIG. 4 shows a cross-section through the tension member taken through the plane IV—IV of FIG. 3, at an enlarged scale;

FIG. 5 shows a cross-section similar to that of FIG. 4 taken through the plane V—V of FIG. 3, at an enlarges scale; and FIG. 6 shows a modified version of the arrangement of FIG. 5.

DETAILED DESCRIPTION OF THE PREFERRED EMBODIMENTS

The reference numeral 1 refers to a plaited jacket enclosing a core 2 disposed therein with play. The core 2 consists of a non-continuous, non-stretchable line 3, having a thickness to be selected depending on the application and on the tension load it is meant to be subjected to. A tow rope, for instance, may have a line thickness between 1 and 2 cm, if it is made of natural fibers. If the line is made of a flexible wire cable or of chemical fibers, a thickness reduced by 40–60% may be sufficient. The terminal portions of the elastic members 5 are fastened to the line 3, uniformly spaced, by means of buttons or clamps 4 forming the mounting joints 6. Each elastic member consists of an endless loop of rubber, or of another suitable elastic material, such as a plastic. The bends of the loop of the elastic member and the buttons or clamps 4 form the mounting joints 6 together with the line 3. The core 3 fails to fill the inner space 7 of the jacket 1 completely, the purpose of this arrangement being to create play. The segments 3' of the line 3 arranged between the mounting joints 6 are curly and greater in length than the elastic members 5 in their non-tensioned states. The free inner space 7 of the jacket 1 accommodates the windings or bends of the segments 3'.

If a tension force is caused to act upon the tension member, the jacket 1 and the core 2 are extended and brought from the state of FIG. 1 into the state of FIG. 2. Applying tension onto the elastic members 5 causes the segments 3' to be pulled along. As soon as elastic members 5 reach their predetermined load limit the segments 3' become subjected to tension and the tension force becomes transferred to the line 3. After surpassing the load limit of the elastic members, the line 3, together with the tightly stretched segments 3', takes over the entire load. A modified version of the elastic member is strap-shaped, as shown in FIG. 6.

Applying the jacket 1 onto the core 2 is performed while the latter, the line 3, and the elastic member 5, are in their extended states. The segments 3' of the line 3 automatically assume their curly states within the inner space 7 between the mounting joints 6 as soon as the elastic members 5 contract. The jacket 1 is produced by means of known machines in operations like plaiting, twisting, and the like, as is customary in ropemaking.

The number of elastic members depends on the length of the tension member. One single elastic member 5, for example, may be sufficient if the requirements call for a relatively short start-cord.

The invention is suited for all kinds of tension devices subject to the requirement that the load acting on the elastic member be not larger than a predetermined load value. Such is the case with tow ropes, start-cords for surf boards, tie devices for transported goods, etc.

Obviously, numerous modifications and variations of the present invention are possible in light of the above teachings. It is therefore to be understood that within the scope of the appended claims the invention may be practiced otherwise than as specifically described herein.

I claim:

1. An elastic tension member, wherein there is disposed within a hoselike jacket a core comprising a line non-stretchable throughout its length and at least one elastic member connected to the line at two spaced mounting joints, a segment of the line located between the joints being curly and longer than the elastic member so that any acting tension forces are transferred to the non-stretchable line as soon as a specific maximum load of the elastic member has been reached.

2. An elastic tension member as claimed in claim 1, wherein the terminal portions of the elastic member are fastened to the non-stretchable line which consists of a cord.

3. An elastic tension member as claimed in claim 1, wherein the terminal portions of the elastic member are fastened to the non-stretchable line by means of clamps or buttons so as to form the mounting joints.

4. An elastic tension member as claimed in claim 1, wherein the core is disposed within the jacket with play, an inner space being thus provided for receiving the curly segment of the non-stretchable line.

5. An elastic tension member as claimed in claim 1, wherein the jacket consists of a plait.

6. A method of making an elastic tension member comprising the steps of forming a core by connecting at least one elastic member at two spaced mounting joints to a line non-stretchable throughout its length so that a segment of said line located between said joints is curly and longer than said elastic member when said elastic member is in a non-tensioned state, any tension forces acting on said core being transferred to said non-stretchanble line as soon as a specific maximum load has been reached, on said elastic member; stretching said core to extend said elastic member and said non-stretchable line; and forming a jacekt about said stretched core so that said core is disposed within a hoselike jacket having an inner space for receiving said curly segment of non-stretchable line.

7. A method of making an elastic tension member as claimed in claim 7 wherein said jacket is formed by braiding strands of jacket material about said stretched core.

* * * * *